UNITED STATES PATENT OFFICE.

WILLIAM R. PATRICK, OF MARINETTE, WISCONSIN.

PROCESS FOR PREPARING WOOD FOR MAKING PAPER-PULP.

SPECIFICATION forming part of Letters Patent No. 227,646, dated May 18, 1880.

Application filed March 31, 1880. (No model.)

*To all whom it may concern:*

Be it known that I, WILLIAM R. PATRICK, of Marinette, in the county of Marinette and State of Wisconsin, have invented a certain new and useful Improvement in Processes for Preparing Wood for Making Paper-Pulp, which is fully described in the following specification.

My invention relates to a process for preparing wood for making paper-pulp, the object being to dissolve and remove the resin and other matter in the wood which unfits it for the manufacture of paper.

The mode of carrying out my invention will be hereinafter fully described, and the special improvement, which is believed to be new, pointed out definitely in the claim.

The wood is cut and prepared in sticks or pieces of suitable size, as usual in processes for making wood-pulp, and these pieces are then packed or piled in a close tank or compartment of any suitable description for holding the wood.

The particular construction of the tank is immaterial, as it is only necessary that it should be water-tight, with the exception of inlet and outlet openings for the admission and exit of water.

In the top of the tank, or in some convenient location over the wood, a perforated plate is arranged, above which water is let into the tank, and at the bottom of the tank is an opening for the outflow of the water.

The perforated plate may form the bottom of a water-pan, or any other construction may be adopted which will serve the purpose I intend, which is to separate the water by passing it through fine openings, so that it is sprinkled upon the wood below. The water employed for this purpose must be hot, preferably of about boiling temperature, or somewhat below. The water may be heated by steam or any other means suitable for the purpose.

In operation the hot water is permitted to flow freely into the tank upon the perforated plate, through which it passes and falls upon the wood below in a fine sprinkle or spray, and passes down through the body of wood, completely saturating it, softening the fiber, and washing therefrom all resinous substances, gums, acids, and other matter which is injurious in the manufacture of paper-pulp from wood. The water, as it reaches the bottom of the tank, is permitted to flow out freely through the exit-opening, carrying off with it continuously the resins, &c. In this operation all the deleterious matter is carried off as fast as dissolved, or in any other way taken up by the water, and is freed at once from contact with the wood, thereby thoroughly cleansing the wood, and without injuring the latter by contact with the dirty water.

In processes where the wood is boiled in water, or the water is circulated over and over through the wood under pressure or otherwise, the latter, although cleansed from injurious substances by action of the water, will be discolored and otherwise impaired for the manufacture of paper by continuous contact with the liquid charged with these substances. Obviously this objection is entirely removed by my process. The water flows in and out of the tank without any pressure, and it is my special object to keep a continual supply of fresh clean water entering and passing through the wood. The passing of water through a sprinkling device thoroughly distributes it over the wood, so that it will become evenly and thoroughly saturated therewith. The hot water enters the upper part of the tank and passes through the wood by the natural operation of gravity, requiring no extra devices or mechanism for keeping up a circulation. The flow of water is continued until the wood is thoroughly softened and washed and ready for the grinding-machine, by which it is reduced to pulp.

The process is applicable to woods of all kinds, and will efficiently cleanse and soften them preparatory to grinding. Soft wood, such as pine and poplar, which are more frequently used in the manufacture of paper, are probably more readily acted upon by the process, however, than the hard woods.

Having thus described my invention, what I claim as new, and desire to secure by Letters Patent is—

In the manufacture of wood paper-pulp, the process herein described of removing resins and other injurious substances from the wood before grinding, the same consisting in packing the wood in a close tank and then passing fresh clean hot water continuously through the wood-body by introducing it to the latter through a sprinkler at the top and removing it at a suitable exit-opening at the bottom of the tank, substantially as described.

WILLIAM R. PATRICK.

Witnesses:
 JOHN B. FAIRCHILD,
 CHARLES M. FAIRCHILD.